United States Patent Office 2,769,017
Patented Oct. 30, 1956

2,769,017

PRODUCTION OF 1.2-EPOXY-CYCLO-OCTANE

Walter Reppe, Otto Schlichting, and Karl Mueller-Gliemann, Ludwigshafen (Rhine), Germany, assignors to Badische Anilin- & Soda-Fabrik Aktiengesellschaft, Ludwigshafen (Rhine), Germany No Drawing. Application June 19, 1953,
Serial No. 362,948

Claims priority, application Germany June 25, 1952

6 Claims. (Cl. 260—348.5)

This invention relates to a process for the production of 1.2-epoxy-cyclo-octane.

We have found that 1.2-epoxy-cyclo-octane can be obtained in good yields by reacting elementary oxygen, in particular air, with liquid cyclo-octene.

The process may be carried out in the presence of oxidation catalysts, such as heavy metal salts of fatty or naphthenic acids, but it is also practicable in the absence of said catalysts. As oxidation catalysts there may be used for example iron, nickel or cobalt stearates, oleates or naphthenates.

The reaction begins even at room temperature; its speed increases as the temperature rises. The most favourable temperatures lie between about 60° and 150° C., preferably between about 90° and 110° C.

It is preferable to react only a part of the cyclo-octene, at the most about 60%. In this way about 60% of the cyclo-octene reacted is converted into the epoxide.

Substances of high boiling point are formed as by-products and among these may be detected cyclo-octenone and cyclo-octenol in an amount of about 12 to 15% of the reacted cyclo-octene, as well as suberic acid and its esters and higher molecular weight condensation products. The amount of these can be reduced by carrying out the oxidation with the addition of alkaline agents, such as magnesium oxide or sodium carbonate, which bind the acid oxidation products formed and prevent them entering into further reaction with the epoxide or with the cyclo-octenol.

The oxidation can be carried out at atmospheric or increased pressure. For example a vigorous current of air can be led through nozzles or glass frits into the bottom of a tube filled with cyclo-octene which is kept at the desired temperature, the vapours entrained with the waste gas being trapped by a superposed cooler. It is also possible to work continuously by simultaneously leading cyclo-octene and air into the bottom of a heated tube and working up the overflowing reaction mixture. It is also possible to work in countercurrent.

1.2-epoxy-cyclo-octane is a valuable intermediate product, for example for synthetic materials, pharmaceutical products and pesticides. Hitherto it has been prepared only by a troublesome and expensive method by reaction of cyclo-octene with peracids, such as perbenzoic or peracetic acids and the isolation and separation of by-products has been difficult. It is surprising that it can be obtained in such a simple way by direct oxidation of cyclo-octene with air, especially as cyclo-hexene by the same treatment does not yield any appreciable amounts of the corresponding epoxide but mainly cyclohexenone and cyclohexenol.

The following examples will further illustrate this invention but the invention is not limited to these examples.

Example 1

425 grams of cyclo-octene in which 1 gram of cobalt naphthenate has been dissolved are charged into an electrically-heatable glass tube arranged vertically which is closed at the bottom by a glass frit and is provided at the top with a reflux condenser. At a temperature of 110° C., 20 litres of air are led through the glass frit per hour. The waste gases, which are freed from entrained vapours in the condenser, contain only 4.8% of oxygen after 2 hours, but 12.2% after 20 hours.

If the oxidation be interrupted after 12 hours, then, after separation of the water formed, there are first recovered by fractional distillation of the reaction mixture, 330 grams of cyclo-octene, corresponding to an amount of reaction of 21%. It can be returned to the oxidation.

Then, at 85° to 88° C. at 17 Torr., 58 grams of 1.2-epoxy-cyclo-octane pass over, corresponding to a yield of 56% with reference to the cyclo-octene reacted. It solidifies on cooling and after repeated distillation forms colourless crystals of the melting point 51° C. For the purpose of further characterisation there may serve the benzoic acid-2-chloro-cyclo-octyl ester $C_6H_5$—COO—$C_8H_{14}Cl$ of the melting point 61° C. formed therefrom by reaction with benzoyl chloride in pyridine or by the hydrolysis to the known cyclo-octane-diol-(1.2) which readily takes place by heating the epoxy-cyclo-octane with dilute hydrochloric acid.

Following the epoxy-cyclo-octane, by the further fractional distillation of the oxidation mixture, there is a fraction of 15 grams passing over between 88° and 98° C. at 17 Torr. which consists of a mixture of cyclo-octenone and cyclo-octenol. There remains a residue of 31 grams which can for example be oxidised to suberic acid by treatment with nitric acid or converted into suberic acid and high molecular weight alcoholic products of hitherto unclarified constitution by alkaline saponification and acidification.

Example 2

425 grams of cyclo-octene are oxidised as described in Example 1 but for 24 hours at 105° C. without the addition of cobalt naphthenate. 175 grams of cyclo-octene are thus recovered, corresponding to an amount of reaction of 59%. There are obtained 163 grams of 1.2-epoxy-cyclo-octane (=55%), 44 grams of a mixture of cyclo-octenone and cyclo-octenol (=15%) and 89 grams of residue (=30%).

Example 3

425 grams of cyclo-octene are oxidised with addition of 1 gram of cobalt naphthenate as described in Example 1 but for 24 hours at 60° C. By working up, 396 parts of cyclo-octene are recovered, corresponding to an amount of reaction of 6.7%. There are obtained 31 grams of 1.2-epoxy-cyclo-octane (66%), 6 grams of a mixture of cyclo-octenone and -octenol (13%) and 10 grams of residue (21%).

By oxidising for 48 hours at 25° C. with 25 litres of air per hour, the amount of reaction is only 2.8%, but the yield of 1.2-epoxy-cyclo-octane is 75% with reference to reacted cyclo-octene.

Example 4

510 grams of cyclo-octene, after the addition of 1 gram of cobalt oleate and 20 grams of magnesium oxide, are oxidised in the way described in Example 1 for 20 hours at 105° C. with 20 litres of air per hour. The oxidation mixture is then filtered. By working up, 325 grams of cyclo-octene are recovered, corresponding to an amount of reaction of 36%. There are obtained 111 grams of 1.2-epoxy-cyclo-octane (=60%), 37 grams of a mixture of cyclo-octenone and -octenol (=20%) and 37 grams of residue (=20%).

Example 5

510 grams of cyclo-octene in which 1 gram of cobalt naphthenate has been dissolved are oxidised in the way described in Example 1, but a solution of 5 grams of sodium carbonate in 50 cubic centimetres of water is also introduced into the reaction tube. The oxidation is carried out at 100° C., with 10 to 20 litres of air per hour. Since the oxidation mixture froths strongly, the amount of air must be regulated carefully and if necessary the duration of oxidation prolonged somewhat.

With an amount of reaction of about 3% of the cyclo-octene, the yield of 1.2-epoxy-cyclo-octane is about 74% of the theoretical yield; there are also obtained about 12% of a mixture of cyclo-octenone and cyclo-octenol and 14% of residue.

What we claim is:

1. A process for the production of 1,2-epoxycylooctane which comprises leading during from 2 to about 48 hours at temperatures from about 25° up to about 150° C. and at ordinary pressure a stream of elementary oxygen into liquid cyclooctene, distilling off the unreacted cyclooctene and isolating the 1,2-epoxy-cyclo-octane by fractional distillation of the residue.

2. A process for the production of 1,2-epoxycyclooctane which comprises leading during from 2 to about 48 hours at temperatures from about 25° up to about 150° C. and at ordinary pressure a stream of air into liquid cyclo-octene, distilling off the unreacted cyclooctene and isolating the 1,2-epoxy-cyclo-octane by fractional distillation of the residue.

3. A process for the production of 1,2-epoxycyclooctane which comprises leading during from 2 to about 48 hours at temperatures from about 25° up to about 150° C. and at ordinary pressure a stream of air in the presence of an oxidation catalyst selected from the group consisting of heavy metal salts of fatty and naphthenic acids into liquid cyclooctene, distilling off the unreacted cyclooctene and isolating the 1,2-epoxy-cyclooctane by fractional distillation of the residue.

4. A process for the production of 1,2-epoxycyclooctane which comprises leading during from about 12 up to about 24 hours at temperatures from about 90° up to about 110° C. and at ordinary pressure a stream of air into liquid cyclooctene at a rate of from about 10 up to about 25 litres of air per hour and from about 425 up to about 510 grams of cyclooctene, distilling off the unreacted cyclooctene and isolating the 1,2-epoxycyclooctane by fractional distillation of the residue.

5. A process for the production of 1,2-epoxycyclooctane which comprises leading during from about 12 up to about 24 hours at temperatures from about 90° up to about 110° C. and at ordinary pressure in the present of cobalt naphthenate a stream of air into liquid cyclooctene at a rate of from about 10 up to about 25 litres of air per hour and from about 425 up to about 510 grams of cyclooctene, until at most 60 percent of the cyclooctene has reacted, distilling off the unreacted cyclooctene and isolating the 1,2-epoxycyclooctane by fractional distillation of the residue.

6. A process for the production of 1,2-epoxycyclooctane which comprises leading during from about 12 up to about 24 hours at temperatures from about 90° up to about 110° C. and at ordinary pressure in the presence of cobalt naphthenate and an alkaline agent selected from the class consisting of sodium carbonate and magnesium oxide a stream of air into liquid cyclooctene at a rate of from about 10 up to about 25 litres of air per hour and from about 425 up to about 510 grams of cyclooctene, until at most 60 percent of the cyclooctene has reacted, distilling off the unreacted cyclooctene and isolating the 1,2-epoxycyclooctane by fractional distillation of the residue.

References Cited in the file of this patent

UNITED STATES PATENTS

| | | |
|---|---|---|
| 2,052,195 | Schneider | Aug. 25, 1936 |
| 2,571,208 | Craig | Oct. 16, 1951 |
| 2,650,927 | Gasson | Sept. 1, 1953 |

OTHER REFERENCES

Reppe et al.: Annalen 560:40 (1948) (C. A. 43: 6195a).